United States Patent
Yeh et al.

(10) Patent No.: US 12,205,158 B2
(45) Date of Patent: Jan. 21, 2025

(54) ONE-CLICK TRANSACTIONS WITH PRODUCT RECOMMENDATIONS IN POST-PURCHASE INTERFACES

(71) Applicant: Bolt Financial, Inc., San Francisco, CA (US)

(72) Inventors: Emily Yeh, San Francisco, CA (US); Chetan Gowda, Fremont, CA (US)

(73) Assignee: Bolt Financial, Inc., San Francisco, CA (US)

( * ) Notice: Subject to any disclaimer, the term of this patent is extended or adjusted under 35 U.S.C. 154(b) by 0 days.

(21) Appl. No.: 17/387,906

(22) Filed: Jul. 28, 2021

(65) Prior Publication Data

US 2023/0033490 A1    Feb. 2, 2023

(51) Int. Cl.
*G06Q 30/00*    (2023.01)
*G06Q 20/40*    (2012.01)
*G06Q 30/0601*    (2023.01)

(52) U.S. Cl.
CPC ....... *G06Q 30/0631* (2013.01); *G06Q 20/401* (2013.01); *G06Q 30/0603* (2013.01)

(58) Field of Classification Search
CPC ........... G06Q 30/0631; G06Q 30/0603; G06Q 20/401
See application file for complete search history.

(56) References Cited

U.S. PATENT DOCUMENTS

| | | | | |
|---|---|---|---|---|
| 5,960,411 A * | 9/1999 | Hartman | ............ | G06Q 30/0635 |
| | | | | 715/962 |
| 9,189,811 B1 * | 11/2015 | Bhosle | ............... | G06Q 30/0641 |
| 9,202,246 B1 * | 12/2015 | Bundy | ............... | G06Q 30/0635 |
| 9,324,098 B1 * | 4/2016 | Agrawal | ................ | G06Q 30/04 |
| 10,185,982 B1 * | 1/2019 | Kane-Parry | ........ | G06Q 30/0603 |
| 11,367,119 B2 * | 6/2022 | Joshi | ................ | G06Q 10/06393 |

(Continued)

FOREIGN PATENT DOCUMENTS

WO    WO-0201398 A2 *    1/2002    ........... G06F 17/243

OTHER PUBLICATIONS

"Google expands retail shopping program with a universal cart, personalization focus," by Judy Mottl, Retail Customer Experience, News Features [Louisville], Mar. 22, 2018 (Year: 2018).*

*Primary Examiner* — Anne M Georgalas
(74) *Attorney, Agent, or Firm* — Baker Botts L.L.P.

(57) ABSTRACT

In one embodiment, a method includes facilitating placing an order by a buyer with a seller. The method includes selecting product recommendations for the buyer using a product recommendation model. The method includes causing an order tracking user interface corresponding to the order to be presented to the buyer on a user device of the buyer. The order tracking user interface includes interactive elements corresponding to a selected product recommendation. The method includes receiving, from the user device of the buyer, a selection of one of the interactive elements corresponding to a selected product recommendation. The method includes retrieving payment information for the buyer based on receiving the selection of the interactive element. The method includes automatically facilitating an order for the product corresponding to the selected interactive element based on the retrieved payment information for the buyer.

18 Claims, 11 Drawing Sheets

(56) References Cited

U.S. PATENT DOCUMENTS

| | | | |
|---|---|---|---|
| 2001/0021914 A1* | 9/2001 | Jacobi | G06Q 30/02 |
| | | | 705/26.1 |
| 2009/0163183 A1* | 6/2009 | O'Donoghue | H04M 7/0024 |
| | | | 455/414.1 |
| 2009/0288012 A1* | 11/2009 | Hertel | G06Q 20/105 |
| | | | 715/769 |
| 2011/0213651 A1* | 9/2011 | Milana | G06Q 30/0224 |
| | | | 705/14.25 |
| 2012/0166308 A1* | 6/2012 | Ahmed | G06Q 20/12 |
| | | | 705/26.41 |
| 2015/0262121 A1* | 9/2015 | Riel-Dalpe | G06Q 50/12 |
| | | | 705/15 |
| 2016/0063435 A1* | 3/2016 | Shah | G06Q 30/0633 |
| | | | 705/44 |
| 2018/0218431 A1* | 8/2018 | Prendki | G06Q 30/0631 |
| 2020/0034910 A1* | 1/2020 | Halbrook | G06Q 30/0631 |
| 2020/0204540 A1* | 6/2020 | Shah | H04L 63/0838 |

* cited by examiner

ONE-CLICK TRANSACTIONS WITH PRODUCT RECOMMENDATIONS IN POST-PURCHASE INTERFACES

TECHNICAL FIELD

This disclosure generally relates to interfaces for recommending and completing a transaction.

BACKGROUND

After a customer (e.g., seller) of a merchant (e.g., buyer) places an order, the merchant can provide information regarding the order to the user. The information provided can include basic transactional information, such as the cost and shipping destination, as well as information allowing the customer to refer back to the order if needed (e.g., transaction or order numbers). Tracking pages can also reference or provide links to information regarding the order that may be useful to the user. For example, an order for flowers can include care instructions for the flower. An order for a package to be delivered by mail can include a tracking number or a link to a tracking system for the package. However, tracking pages are often fairly static endeavors and only reference the present order made by the customer. Moreover, a merchant typically has limited options for customizing the tracking page based on the merchant's own brand or based on the needs and interests of the customer.

SUMMARY OF PARTICULAR EMBODIMENTS

Embodiments described herein include systems and methods for automatically facilitating orders for buyers with sellers based product recommendations presented to the buyer in a tracking page for an order previously placed with the seller. In particular embodiments, a transaction processing system facilitates the placing of an order by a buyer with a seller. The transaction processing system selects one or more product recommendations for the buyer using a product recommendation model based on one or more features associated with the buyer, the seller, or the order. The transaction processing system causes an order tracking user interface corresponding to the order to be presented to the buyer on a user device of the buyer that includes a set of interactive elements. One or more of the interactive elements corresponds to a selected product recommendation. The transaction processing system receives, from the user device of the buyer, a selection of one of the one or more interactive elements corresponding to a selected product recommendation. The transaction processing system retrieves payment information for the buyer based on receiving the selection of the interactive element. The transaction processing system automatically facilitates an order for the product corresponding to the selected interactive element based on the retrieved payment information for the buyer.

The embodiments disclosed above are only examples, and the scope of this disclosure is not limited to them. Particular embodiments may include all, some, or none of the components, elements, features, functions, operations, or steps of the embodiments disclosed above.

DESCRIPTION OF EXAMPLE EMBODIMENTS

Figure 1:
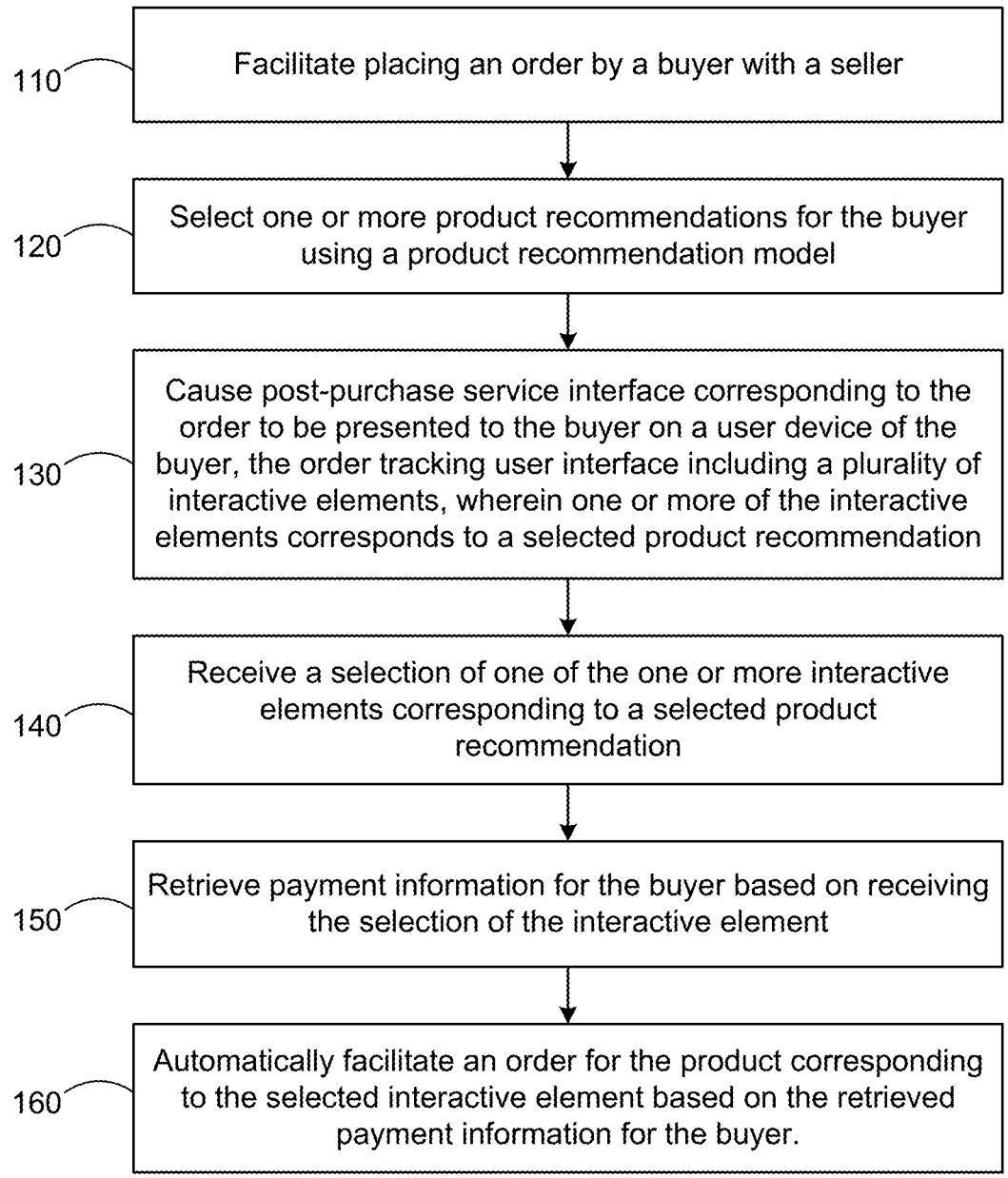
FIG. 1 illustrates an example method for performing one-click transactions with product recommendations in post-purchase support interfaces.

Particular embodiments disclosed herein may be designed to address specific problems or omissions in the current state of the art as described herein. As described herein, particular embodiments include systems and methods for automatically facilitating orders for buyers with sellers based product recommendations presented to the buyer in a tracking page for an order previously placed with the seller. In particular embodiments, a transaction processing system facilitates the placing of an order by a buyer with a seller. The transaction processing system selects one or more product recommendations for the buyer using a product recommendation model based on one or more features associated with the buyer, the seller, or the order. The transaction processing system causes an order tracking user interface corresponding to the order to be presented to the buyer on a user device of the buyer that includes a set of interactive elements. One or more of the interactive elements corresponds to a selected product recommendation. The transaction processing system receives, from the user device of the buyer, a selection of one of the one or more interactive elements corresponding to a selected product recommendation. The transaction processing system retrieves payment information for the buyer based on receiving the selection of the interactive element. The transaction processing system automatically facilitates an order for the product corresponding to the selected interactive element based on the retrieved payment information for the buyer. In particular embodiments, the transaction processing system determines a personalized presentation of the interactive elements based on the product recommendation model. The personalized presentation can include an order or position of the one or more interactive elements corresponding to the selected product recommendation in the order tracking user interface. In particular embodiments, the transaction processing system selects one or more of the product recommendations for the buyer based on, for example, a time from the placing of the order, a method of placing the order, an order history between the buyer and seller, or a user device type of the user device.

In particular embodiments, facilitating placing an order by a buyer with a seller includes the transaction processing system receiving a user identifier for the buyer, storing the user identifier in association with order information in a database associated with the transaction processing system. The order information includes one or more features used by the product recommendation model. In particular embodiments, the transaction processing system determines that the user identifier for the buyer corresponds with user account information stored in the database associated with the transaction processing system. The transaction processing system updates the user account information corresponding to the user identifier for the buyer in the database associated with the transaction processing system. In particular embodiments, the transaction processing system determines that the user identifier for the buyer does not correspond with user account information stored in the database associated with the transaction processing system. The transaction processing system creates a new record of user account information corresponding to the user identifier for the buyer in the database associated with the transaction processing system. In particular embodiments, the order tracking user interface is an email sent to the buyer on behalf of the seller, a short message service message sent to the buyer on behalf of the seller, a web page provided by merchant or provided by the transaction processing system on behalf of the seller, or a user interface of an application associated with the seller or the transaction processing system executing on the user device.

In particular embodiments, the product recommendation model is provided by the seller and the one or more product recommendations for the buyer are presented in the user interface via an application programming interface provided by the transaction processing system. In particular embodiments, the product recommendation model is configured to provide recommendations of featured products offered the seller, wherein the featured products are determined by the seller. In particular embodiments, the product recommendation model is configured to provide personalized recommendations of products offered by the seller. In particular embodiments, the product recommendation model is provided by the transaction processing system for the benefit of the seller. In particular embodiments, prior to selecting one or more product recommendations for the buyer using the product recommendation model based on one or more features associated with the buyer, the seller, or the order, the transaction processing system accesses a merchant inventory system associated with the seller, analyzes available inventory of the seller through the merchant inventory system, and normalizes the available inventory of the seller to generate training data for the product recommendation model. In particular embodiments, retrieving payment information for the buyer based on receiving the selection of the interactive element includes determining a user identifier for the buyer based on the user device and the receiving the selection of the interactive element, and retrieving the payment information for the buyer from the database associated with the transaction processing system using the determined user identifier. In particular embodiments, automatically facilitating the order for the product corresponding to the selected interactive element based on the retrieved payment information for the buyer includes placing the order for the product corresponding to the selected interactive element using the retrieved payment information for the buyer without requiring further interaction from the buyer. In particular embodiments, automatically facilitating the order for the product corresponding to the selected interactive element based on the retrieved payment information the buyer includes causing an account authentication user interface to be displayed to the user on the user device, sending a one-time password to the user device via a communication channel associated with the user identifier, receiving the one-time password from the user device via the account authorization user interface, and determining that the one-time password sent to the user device corresponds with the one-time password received from the user device via the account authorization user interface.

In further embodiments a method includes displaying, by a user device associated with a buyer, an order tracking user interface corresponding to an order previously placed by the buyer with a seller. The order tracking user interface includes interactive elements with one or more of the interactive elements corresponding to a product recommendation. The user device receives a user input corresponding to one of the one or more interactive elements corresponding to the product recommendation. The user device sends a message corresponding to the selection of the one of the one or more interactive elements to a transaction processing system. The user device receives, from the transaction processing system, a confirmation that an order has been automatically placed with the seller on behalf of the buyer for an item corresponding to the selected one of the one or more interactive elements. In particular embodiments, the user device displays an order tracking user interface corresponding to the order automatically placed with the seller on behalf of the buyer for an item corresponding to the selected one of the one or more interactive elements. In particular embodiments, subsequent to sending the message corresponding to the selection of the one of the one or more interactive elements to the transaction processing system, the user device displays an account authentication user interface and receives a user input corresponding to a one-time password via the account authentication user interface. In particular embodiments, the order tracking user interface includes an email sent to the buyer on behalf of the seller, a short message service message sent to the buyer on behalf of the seller, a web page provided by merchant or provided by the transaction processing system on behalf of the seller, or a user interface of an application associated with the seller or the transaction processing system executing on the user device.

After a customer (e.g., seller) of a merchant (e.g., buyer) places an order, the merchant can provide information regarding the order to the user. The information provided can include basic transactional information, such as the cost and shipping destination, as well as information allowing the customer to refer back to the order if needed (e.g., transaction or order numbers). Tracking pages can also reference or provide links to information regarding the order that may be useful to the user. For example an order for flowers can include care instructions for the flower. An order for a package to be delivered by mail can include a tracking number or a link to a tracking system for the package. However, tracking pages are often fairly static endeavors and only reference the present order made by the customer. Moreover, if a merchant wishes to save on costs and effort, they can use a turnkey solution for providing post-purchase support, including tracking pages. This comes, however, with a tradeoff of limited options for customizing the tracking page based on the merchant's own brand or based on the needs and interests of the customer. Otherwise, a merchant may need to build a custom solution.

Particular embodiments described herein relate to a post-purchase support interface, referred to also herein as a post-purchase page or order tracking page, that enables novel features allowing a merchant to provide opportunities for a user to make additional purchases based on or relating to a recently placed order. In particular, through managing multiple aspects of the order placement and purchase completion process, a transaction processing system can provide a post-purchase support interface featuring one-click order placement from certain user devices. In embodiments described herein, the post-purchase support interface includes new features and behavior, including options for dynamically generated recommendations that can be customized based on merchant, the customer, and properties of a pending transaction. The one-click ordering and recommendations are based on a user account system integrated into the checkout experience that uniquely associates a user with relevant payment and other account information across merchants and throughout the post-purchase period.

Many ecommerce merchants provide merchant-specific account systems. Users can create accounts with merchants to enable features such as more convenient checkout experiences through storage and retrieval of user preferences and payment information. However, the user must affirmatively create the account, maintain a secure password, and ultimately trust the merchant to securely store their information. Currently, most ecommerce transactions are conducted with the customer operating in a "guest" mode, outside of the merchant account systems. Among independent merchants customers that conduct transactions in the guest mode cannot be tracked, their preferences cannot easily be learned, and recommendations can only be based on broad features, not personalized to the customer. Certain large merchants successfully manage user account systems, however these accounts cannot be easily shared with independent merchants.

As described herein, a transaction processing system can provide for cross-merchant user accounts, where a user can choose to associate user identifying information that uniquely identifies the user to the transaction processing system with payment information, shipping information and preferences, and an overall user profile. The transaction processing system can receive the user identifying information from a customer or a merchant during a checkout procedure for a given order. The transaction processing system can determine whether the received user identifying information corresponds to a user account and, if so, enable features of a checkout experience for the customer accordingly. For example, a customer can see their preferred payment method and shipping terms pre-populated during the checkout experience. In particular embodiments, the transaction processing system can enable a one-click checkout experience, where, after a user is logged into the transaction processing system for a checkout experience, a minimal number of interactions from the user are needed to place the order with the merchant.

In combination with these features, and using the user account system, the transaction processing system can make advanced post-purchase support interfaces available for merchants to provide to their customers. Because the transaction processing system is able to recognize a customer across merchants and even user devices, the transaction processing system can provide new features to post-purchase support interfaces, such as dynamic product recommendations presented in the post-purchase support interface. The dynamic product recommendations can be further enhanced with an easy check-out whether or not the user has recently logged into an account with the transaction processing system.

In particular embodiments, the transaction processing system can provide an application programming interface (API) for inserting product recommendations into post-purchase support interfaces. For example, the transaction processing system can determine when a user is viewing or requesting to view a post-purchase support interface for an order with a merchant. The transaction processing system can alert the merchant or a merchant vendor, that the user will be shown product recommendations through a call on the API and receive in return a set of product recommendations to display in the post-purchase support interface. In other embodiments, the transaction processing system can build a product recommendation model to identify and generate product recommendations for the user. The transaction processing system product recommendation model can be trained to identify inventory items offered by the merchant and recommend a set of the inventory items to a user in a post-purchase support interface according to criteria set by the transaction processing system, the merchant, or the user. Additionally, because the recommendations and the post-purchase support interface itself can be generated dynamically, the layout and arrangement of data on the post-purchase support interface can be adjusted according to user preferences, stated or inferred.

Ultimately, the novel post-purchase support interface and support programming interfaces provide an array of benefits to merchants, users, and the transaction processing system itself. These benefits are a result of the technologically-oriented and -rooted solutions to the technical problems, described herein, which arise in the field of facilitating e-commerce transactions, and in particular the field of post-purchase support. As an example, in addition to being features not presently available in post-purchase support technology generally, dynamically generated recommendations can ensure that computational and network resources used to render and display post-purchase support interfaces are not misused on recommendations that are irrelevant to a customer. The further integration of a so-called one-click checkout procedure for recommended items can reduce the use of computational resources to provide user interfaces to place an order using standard checkout procedures, while managing the risk of fraud or security breach associated with ecommerce purchases.

Particular embodiments disclosed herein may provide one or more of the results, effects, or benefits described herein. FIG. 1 illustrates an example method 100 for facilitating an order corresponding to a product recommendation through buyer interaction with an interactive element presented in a post-purchase serving interface. In particular embodiments, the method can begin at step 110, where a transaction processing system facilitates placing an order by a buyer with a seller. The buyer, or merchant, can be an ecommerce merchant operating a website. The buyer can use the transaction processing system in various capacities as part of their order placement and fulfillment lifecycle. For example, the transaction processing system may operate a number of APIs which allow merchants to process payments (e.g., virtual wallets, payment cards, etc.) through the transaction processing system. Certain merchants can use a more in-depth version of the services offered by the transaction processing system. For example, the merchant can use the transaction processing system to receive order information from sellers, coordinate receiving payment and shipping options form the seller, charge the sellers, track a transaction history with the seller, and, as described herein, provide for post-purchase support through the transaction processing system.

In embodiments, the buyer may select one or more items offered for sale by the seller. The buyer may add the items to a shopping cart-style interface and, when they have finished choosing items, select an interface element associated with the merchant's storefront to initiate the checkout procedure. In particular embodiments, during the checkout procedure, the buyer can be encouraged to enter user identifying information. The user identifying information may be information to uniquely identify the user to the merchant and/or to the transaction processing system. The user identifying information can also correspond with communication channels through which the buyer can be reached on demand. As an example, user identifying information can include an email, a phone number, a handle used with particular social media platforms, etc. After receiving the user identifying information (e.g., a user identifier), the transaction processing system can request the user to enter addresses to use for shipping or billing purposes, payment information, and other, backup communication information reaches the buyer. In particular embodiments, as described, the buyer may have an account with the transaction processing system. The transaction processing system may recognize the user identifier, retrieve information to affect the order, and display the information for confirmation from the buyer rather than require the buyer to re-enter the information. Once satisfied, the buyer can select another interface element to confirm and place the order.

After the order has been placed by the buyer, the transaction processing system can ensure that the seller receives payment from the buyer and forward information necessary to fulfill the order to the seller. The transaction processing system can also store the user identifier in association with the entered order information. For example, the transaction processing system can maintain one or more databases to store user identifiers, user payment information, shipping information and preferences, and other information that is used to enable one-click checkout. The transaction processing system can also maintain, in the same or logically related databases, an order history of buyers with sellers that have been placed through the transaction processing system. The order information stored in association with the user identifier for the buyer may vary based on the information requested by the seller (and hence, the transaction processing system) during the checkout process. As described herein, this order information can be used by a product recommendation model to generate product recommendations to the buyer on request from the seller or from the transaction processing system.

In particular embodiments, after determining that the user identifier for the buyer corresponds with existing user account information stored in the database, the transaction processing system may update the user account information corresponding to the user identifier for the buyer in the database associated with the transaction processing system. Alternatively, the buyer may not have had an existing account with the transaction processing system prior to the order. The transaction processing system may determine this based on determining that the user identifier for the buyer does not correspond with user account information stored in the database associated with the transaction processing system. In response, the transaction processing system may create a new record of user account information corresponding to the user identifier for the buyer in the database associated with the transaction processing system. Note that this new account record can be created at any suitable point in the checkout process, although it may be preferred to wait until affirmative consent for creating the account has been provided by the user.

After the buyer places their order with the seller, the buyer may wish to receive or view updates associated with their order. For example, the buyer may be eagerly anticipating the delivery of the order and may want to ensure that the items in the order have shipped or track the shipping process generally. The seller may wish to provide this functionality to the buyer so that the buyer can verify that the order is proceeding. According to embodiments described herein, this post-purchase support can be provided by the transaction processing system on behalf of the seller. For example, the transaction processing system can use the contact information (e.g., user identifiers) entered by the buyer during checkout or account creation to send updates to the buyer. The updates can be delivered, for example, as short message service (SMS) messages or as emails, depending on the preferred communication channel selected by the buyer. Additionally, the transaction processing system can provide a landing page on a website operated by the seller or by the transaction processing system on behalf of the buyer. The landing page can be associated with a unique link corresponding to the order. When the transaction processing system (or merchant) receives a request for the landing page, the transaction processing system can use information encoded in the unique link to identify the order and/or the buyer and cause the relevant information to be presented to the buyer. The transaction processing system can provide for similar functionality to be presented to the user through an application executing on a user device of the user.

In response to receiving a request to generate a post-purchase support interface, e.g., an order tracking page, the transaction processing system can prepare interface elements that will be presented to the user in the post-purchase support interface. The request can be received from the merchant (e.g., requesting that an update email be sent to the buyer), from the user (e.g., requesting that that a website embodiment of the post-purchase support interface be updated), or can be provided by the transaction processing system automatically (e.g., based on an elapsed amount of time or at defined stages in the order fulfillment process). Some of the interface elements prepared by the transaction processing system can merely relay information to the buyer. For example, interface elements can relate to identifying the order or the seller. In addition, interface elements can be interactive, such as a map element showing relevant locations to the order, such as the current item location. According to the embodiments described herein, the transaction processing system can designate one or more of the interface elements to correspond to a product recommendation for the buyer.

Returning to the method 100 illustrated in FIG. 1, in particular embodiments, at step 120 the transaction processing system selects one or more product recommendations for the buyer using a product recommendation model. The selection of the product recommendations for the buyer can be based on one or more features associated with the buyer, the seller, or the order. The features can be provided to the product recommendation model, which is configured to identify the products to be recommended to the user.

The product recommendation model can be embodied in a variety of distinct structures and can be accessed in a number of ways based on the configuration of the transaction processing system and the merchant system as well as the relationship between the two. For example, the product recommendation model can be provided by the seller. The seller may have developed their own systems for recommending products to a user, such as through an advertising system. The seller may wish to use the transaction processing system to present the recommendations, such as to use the one-click checkout features described herein but may choose to use their own product recommendation model. In said embodiments, the product recommendation model is made available for use by the transaction processing system. For example, the product recommendation model can be presented with an API that is accessible by the transaction processing system (e.g., the transaction processing system can be provided to access the model on the API). Then, when the transaction processing system is building a post-purchase support interface for display to the seller, the transaction processing system calls the API for the recommendation model and receives in return a number of product recommendations. Calls to the API can include parameters such as the number of product recommendations requested, the identity of the seller, the amount of time since the placing of the order, the items in the order, and other related features.

In particular embodiments, a relatively straightforward implementation of the recommendation may simply provide recommendations of featured products offered by the seller. For example, the seller can select certain products, based on time, location, buyer demographics, etc., to recommend to any seller on request. In particular embodiments, the product recommendation model can be configured to provide personalized recommendations. For example, based on the identity of the buyer (as captured in the user information stored by the transaction processing system), the product recommendation model can select products to recommend to the buyer that are believed or expected to be of interest to the buyer. For example, the seller can determine that, based on the buyer's past purchases, the buyer is likely to be interested in a specific color variant of the product, or may be interested in a new product offered by the seller that the buyer has not yet purchased. The recommendations can further be informed based on the order which the buyer is reviewing.

As another example embodiment of the product recommendation model, the transaction processing system can provide the product recommendation model for use on behalf of, or for the benefit of, the merchant. In contrast to the embodiment described above, where a merchant supplies their own product recommendation model, the transaction processing system can generate its own product recommendation model as part of a full-service post-purchase support system. The product recommendation model can, for example, be a machine-learned model trained using the data available to the transaction processing system by virtue of it interfacing with users and merchants across many ecommerce fields. The data can include a corpus including the products available from merchants, a record of recommendations, a success rate based on the number of conversions, and a record of the users to whom recommendations were made, among other features. The model may be trained on only data from an individual merchant. Such a model will be highly tailored to the merchant but may lack a breadth of training experience. The model may be trained on data from merchants in a similar category or offering similar products. The model may be trained on data from across the entirety of the transaction processing system.

In particular embodiments, to train the product recommendation model the transaction processing system may analyze the inventory available from a merchant, both to collect a record to ensure recommendations are up to date (e.g., that recommendations align with available products) and to normalize the inventory for training purposes. Prior to selecting one or more product recommendations for the buyer using the product recommendation model based on one or more features associated with the buyer, the seller, or the order, the transaction processing system may access an inventory system maintained by the seller. Access to the inventory system can be provided directly from the seller or may be made available from a third party, such as when the inventory system is provided by a merchant vendor. The transaction processing system may ingest the inventory system information for use in training the product recommendation model or in making recommendations for the seller. Not all merchant inventory systems will be organized the same manner and merchant inventory systems may not provide the same set of data, differing even based on how the merchant uses the system. Therefore, some amount of normalizing the data must be performed before it can be used by the transaction processing system in making product recommendations. Normalization can include determining comparable variables and minimum amounts of data required for a product recommendation model to be viable. Normalization can also include reorganizing the data to correspond across merchants, such as by storing items according to universal identifiers (e.g., stock keeping units) instead of names attributed to the by the merchant.

In addition to personalizing product recommendations for the buyer, which will be reflected in the presentation of the post-purchase support interface, the transaction processing system can customize how the post-purchase support interface is organized. For example, the transaction processing system can modify the order of interface elements corresponding to products, icons and images associated with the product used in the interactive elements, a position of interactive elements in an absolute or relative sense, and other similar parameters.

As described herein, the transaction processing system can use a variety of data points in making recommendations. The input for recommendations for a seller can be based on the seller itself or based on the data provided by the seller to the transaction processing system. As an example only, and not by way of limitation, features that may be used to make product recommendations for a buyer include a time from the placing of the order between the buyer and seller, a history of orders between the buyer and seller, the buyer's transactions with other merchants through the transaction processing system, the method in which the order was placed (e.g., mobile, desktop, phone, etc.), the make and model of a device used to place the order, the type and number of items included in the order, common pairings or dependencies between times (e.g., shoes and socks), colors of items in the order, materials used in manufacturing the order, and many other features.

Returning to the method 100 illustrated in FIG. 1, in particular embodiments, at step 130 the transaction processing system causes a post-purchase support interface corresponding to the order to be presented to the buyer on a user device of the buyer. As an example, the post-purchase user interface can be a user interface to track the buyer's order. The post-purchase user interface is specifically configured, according to the determination made by the transaction processing system discussed above, to include a number of interactive elements that provide added features to the post-purchase support interface. In particular embodiments, one or more of the interactive elements correspond to the selected product recommendations. The correspondence can be noted to the buyer based on, for example, text, images, or video used to produce the interactive elements. The correspondence can be noted by the transaction processing system based on commands associated with the interactive elements. As an example, the interactive elements can include buttons or selectable images associated with each item. The buttons can be encoded with links that cause the user device, after the buyer has selected the button, to call a programming interface of the transaction processing system with information regarding the corresponding product. In particular embodiments, multiple interactive elements can be associated with a corresponding product, with each interactive element including different associated actions. For example, a first interactive element can include a purchase action (e.g., "a Buy Now" button), while another interactive element can be used to present more information or save the product for review at a later time.

In particular embodiments, at step 140, the transaction processing system receives a selection of one of the one or more interactive elements corresponding to a selected product recommendation. For example, the interactive elements are presented in the post-purchase support interface on the user device of the buyer. The user can click or tap one of the interactive elements. The user device can then issue a call to the programming interface of the transaction processing system according to the programming associated with the interactive element. This causes a notification of the selection to be delivered to the transaction processing system.

In particular embodiments, the transaction processing system is configured to interpret the selection of an interactive element. Where the selection is configured to be interpreted as a request to purchase the product corresponding to the interactive element, at step 150, the transaction processing system retrieves payment information for the buyer. In addition, the transaction processing system may retrieve other user account information for the buyer based on receiving the selection. For example, the transaction processing system may save the buyer's selection for use as a feature in making future recommendations. In particular embodiments, the notification of the selection can provide information to identify the buyer. For example, the link associated with the interactive element can be made unique to the buyer and can include identifying information for the buyer or a token corresponding to the identifying information. When the transaction processing system receives the selection, this identifying information and/or token can also be provided. As another example, the user device used to view and select the interactive element can send a unique device identifier for itself to the transaction processing system. The device identifier can be stored by the transaction processing system in its database of user account information as a first line of identifying a user. Through one or more of these means, the transaction processing system can identify a record corresponding to the buyer in the database associated with the transaction processing system used to store user account information. The transaction processing system can retrieve, from the record buyer order details, such as the buyer's preferred payment method, shipping address, and preferred shipping terms.

After identifying the payment information for the buyer, at step 160, the transaction processing system may automatically facilitate an order for the product corresponding to the selected interactive element based on the retrieved payment information. The buyer may not leave the post-purchase service interface in order to complete the purchase. In certain embodiments, all that is required is for the buyer to confirm the order details with a single click. For example, a modal or other interface element configured by the transaction processing system can be presented on the user device of the buyer. The modal can include the retrieved payment information, shipping information, and other information needed to complete the transaction. In some embodiments, the selection can be interpreted as confirmation, so that no further interaction from the buyer is needed.

In particular embodiments, to ensure security of the buyer's account, and protected against accidental one-click errors, the transaction processing system can provide an account authentication user interface. The account authentication user interface can require the buyer to enter a password to verify the buyer's identity. In certain embodiments, the account authentication user interface requests the buyer to enter a one-time password before proceeding to log in to the buyer's account and request the purchase of the selected product. Concurrently with displaying the account authentication user interface, the transaction processing system can send a one-time password to the user via a communication channel associated with the user identifier. For example, where the user identifier is an email, the transaction processing system can send the one-time password to the email address. Similarly, the user identifier can be a phone number and the one-time password can be sent as an SMS message. Alternatively, the approach used to send the one-time password can vary based on which user device is displaying the account authentication user interface. For example, if the transaction processing system determines that the buyer is logging in through their laptop, the one-time password can be sent to the buyer's mobile phone (e.g., as an SMS message or push notification) to lessen the impact of a single point of failure in the security of the buyer's devices.

After receiving the one-time password, the user can input the one-time password into the appropriate fields of the account authentication user interface, such as by typing in requested numbers. The user device then sends the one-time password to the transaction processing system. The transaction processing system can receive the one-time password from the user device and compare the received one-time password to the expected value. When the transaction processing system determines that the one-time password sent to the user device corresponds with the one-time password received from the user device via the account authorization user interface, the buyer can be allowed access to the account, including to make purchases such as the purchase for the product relating to the selected user interface.

As part of facilitating the order for the product, the transaction processing system can cause funds corresponding to the order to be moved from an account of the buyer to an account of the seller. In particular embodiments, the transaction processing system can send requests to an acquirer system, an issuer system, or another entity associated with the payment method used by the buyer to affect the transfer of funds. The transaction processing system can also send the order to the merchant for fulfillment.

Figure 2A:
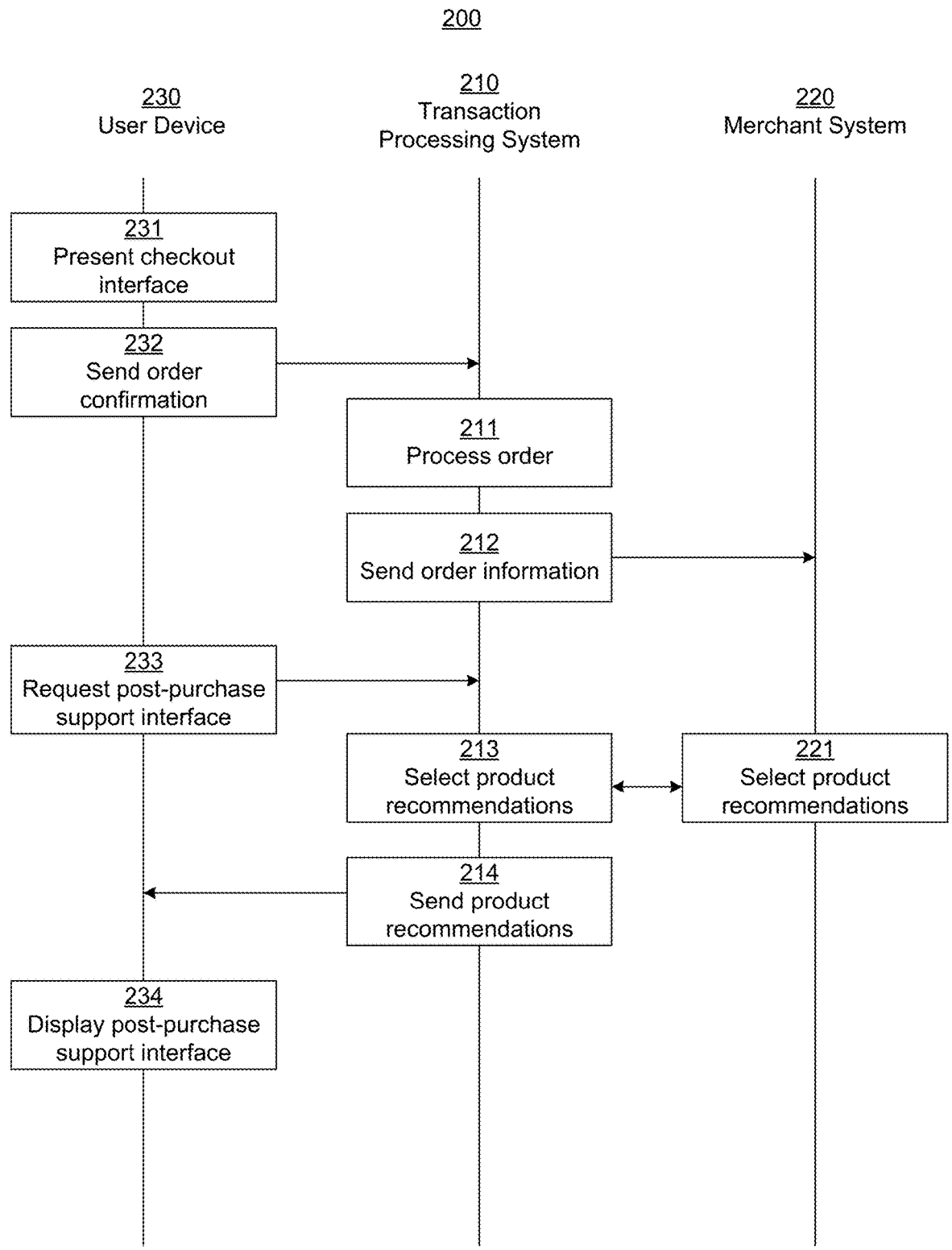
FIGS. 2A-2B illustrates example interactions between systems in performing one-click transactions with product recommendations in post-purchase support interfaces.

FIG. 2A illustrates example interactions between systems in performing one-click transactions with product recommendations in tracking interfaces. The process begins at 231 where the user device 230 presents a checkout interface to a buyer for an order. The checkout interface can include information to allow the buyer to verify the entered information before agreeing to the purchase by selecting an appropriate user interface element. At 232, the user device 230 sends an order confirmation for the order to the transaction processing system. At 211, the transaction processing system processes the order, for example by arranging for payment between the buyer and seller and storing the order details for analytical purposes. At 212, the transaction processing system sends the order information to the merchant system 220 so that the seller can begin to fulfill the order.

At 233, the buyer requests a post-purchase support interface corresponding to the user. The user device 230 sends the request, on behalf of the buyer, to the transaction processing system 210. At 213 and 221, while preparing the post-purchase support interface, the transaction processing system 210 and merchant system 220 select one or more product recommendations using a recommendation model as described herein. As illustrated, the transaction processing system 210 and merchant system 220 coordinate to select the product recommendation. At 214, the transaction processing system 210 sends the product recommendations to the user device 230 for display in the post-purchase support interface. At 234, the user device 230 displays the post-purchase support interface including one or more interactive user elements corresponding to the product recommendations.

Figure 2B:
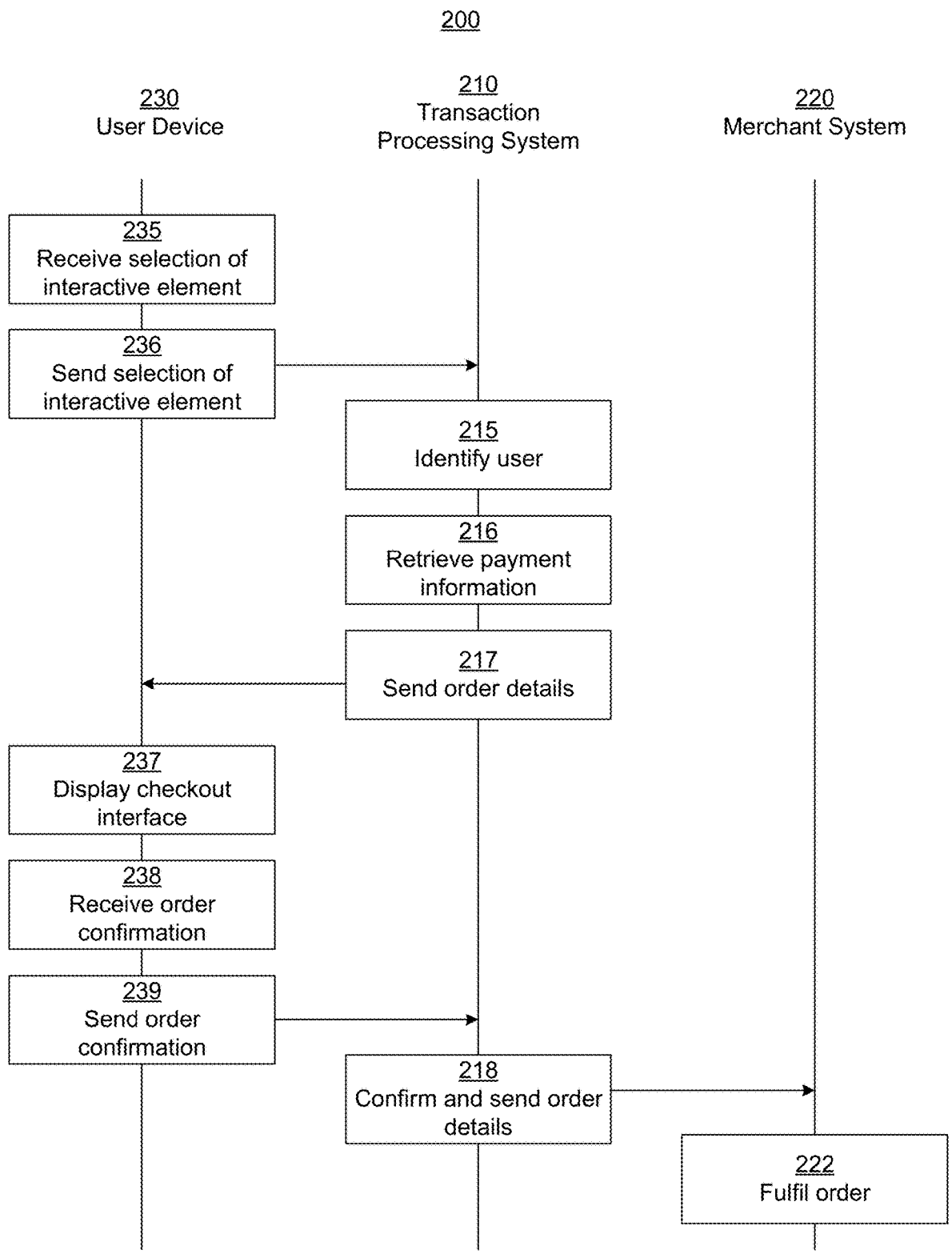

Continuing on to FIG. 2B, at 235, the user device 230 receives a user input corresponding to a selection of an interactive element corresponding to a product recommendation. At 236, the user device 230 sends the selection of the interactive element to the transaction processing system 210. At 215, based on receiving the selection, the transaction processing system 210 identifies the user corresponding to the selection, the buyer. The transaction processing system 210 can use information included in the selection to facilitate this identification. At 216, the transaction processing system 210 retrieves payment information for the buyer from a database associated with the transaction processing system. At 217, the transaction processing system 210 sends order details corresponding to an order for the product corresponding to the selected interactive element to the user device 230. The order details can include, for example, a description of the product and its cost, the retrieved payment information, a shipping address for the buyer, and other information stored by the transaction processing system 210. At 237, the user device displays a checkout interface including the received order details. The checkout interface can be modal provided by the transaction processing system 210. At 238, the user device 230 receives an order confirmation or authorization from the buyer to place the order. At 239, the user device sends the order confirmation to the transaction processing system 210. At 218, the transaction processing system confirms the details of the order and sends the order details to the merchant system 220. At 222, the merchant system begins to fulfill the new order.

Particular embodiments may repeat one or more steps of the example process(es), where appropriate. Although this disclosure describes and illustrates particular steps of the example process(es) as occurring in a particular order, this disclosure contemplates any suitable steps of the example process(es) occurring in any suitable order. Moreover, although this disclosure describes and illustrates an example process, this disclosure contemplates any suitable process including any suitable steps, which may include all, some, or none of the steps of the example process(es), where appropriate. Furthermore, although this disclosure describes and illustrates particular components, devices, or systems carrying out particular steps of the example process(es), this disclosure contemplates any suitable combination of any suitable components, devices, or systems carrying out any suitable steps of the example process(es).

FIGS. 3A-3D illustrate example user interfaces that may be used in performing one-click transactions with product recommendations in post-purchase support interfaces.

Figure 3B:
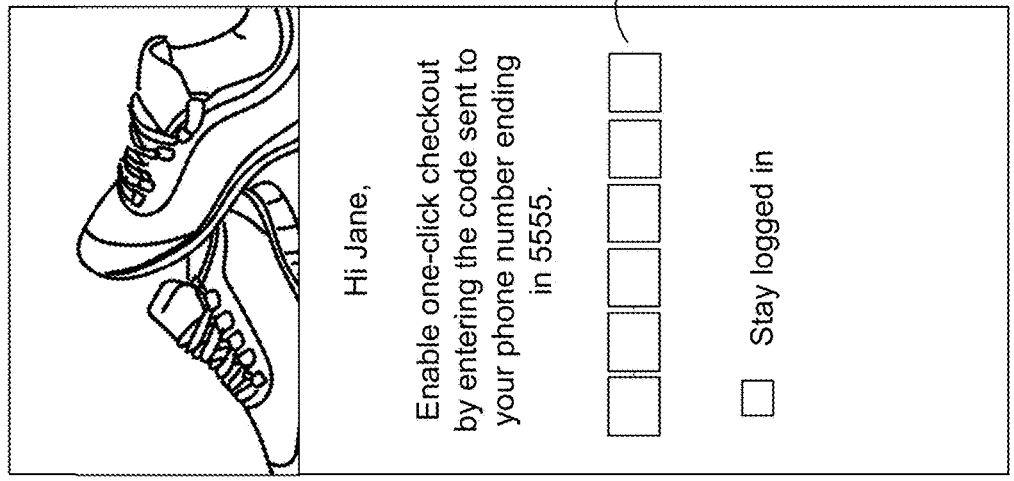
FIGS. 3A-3D illustrates example user interfaces.
Figure 3A:
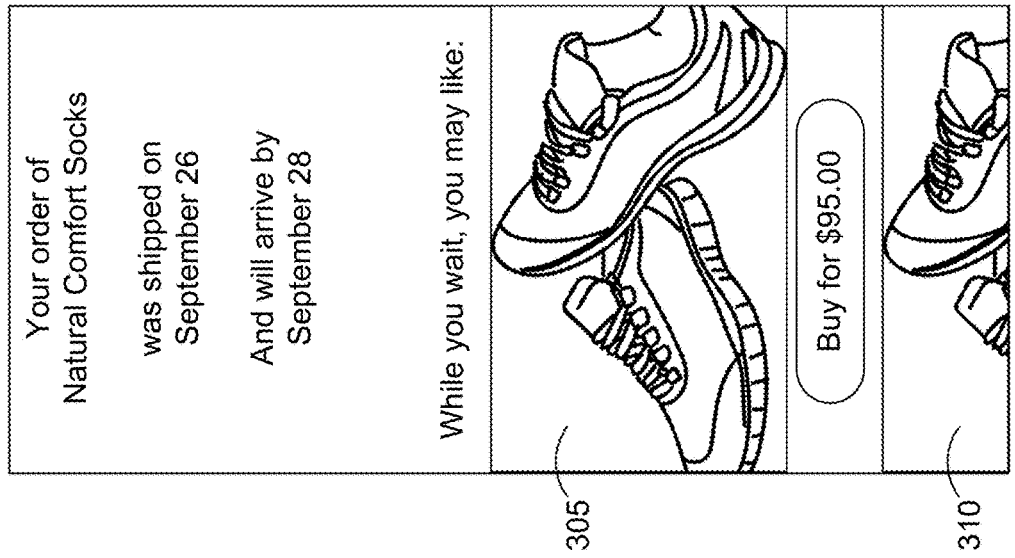

FIG. 3A illustrates a post-purchase support interface 300a (e.g., an order tracking interface). The interface 300a includes a number of interactive and static interactive elements. Interactive elements 305 and 310 correspond to recommendations for products that may be related to the previous order placed by a buyer with a seller.

FIG. 3B illustrates an account authentication user interface 300b. Upon selection of the interactive element 305, the user device sends an order request to the transaction processing system. The transaction processing system determines that the buyer's identity should be confirmed and sends a one-time password to the buyer's phone number. The account authentication user interface 300b includes an element 315 through which the user can enter the received one-time password to login and place the order.

Figure 3C:
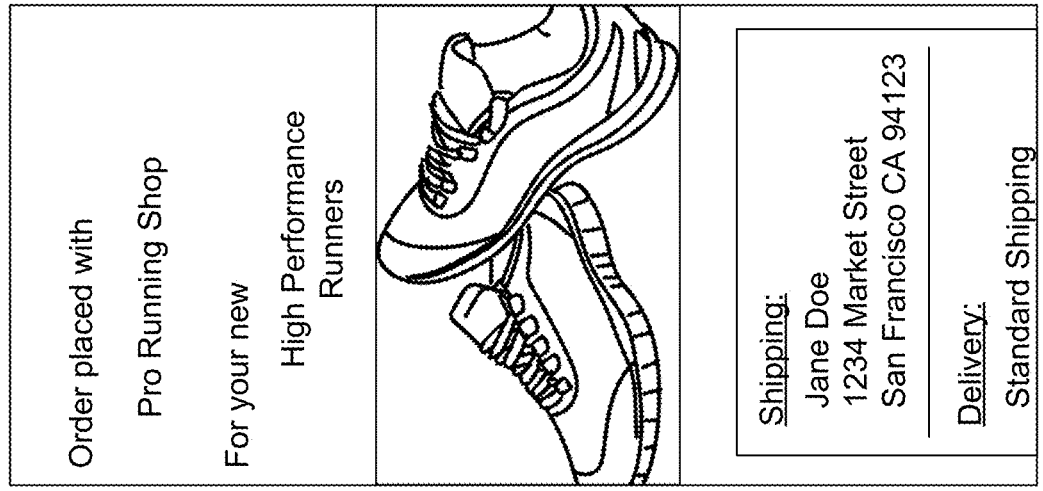

FIG. 3C illustrates a one-click order authorization interface 300c corresponding to an order for the recommendation item associated with the interactive element 305, which was selected by the user. The interface 300c can be shown after the user logs in through the account authentication user interface 300b or, if the user is already logged in, after the user selects the interactive element 305. The interface 300c displays the user's preferred payment method 320, shipping address 325, and shipping details 330 which were retrieved by the transaction processing system and sent to the user device. After confirming the details, the user can select interactive element 335 to place the order.

Figure 3D:
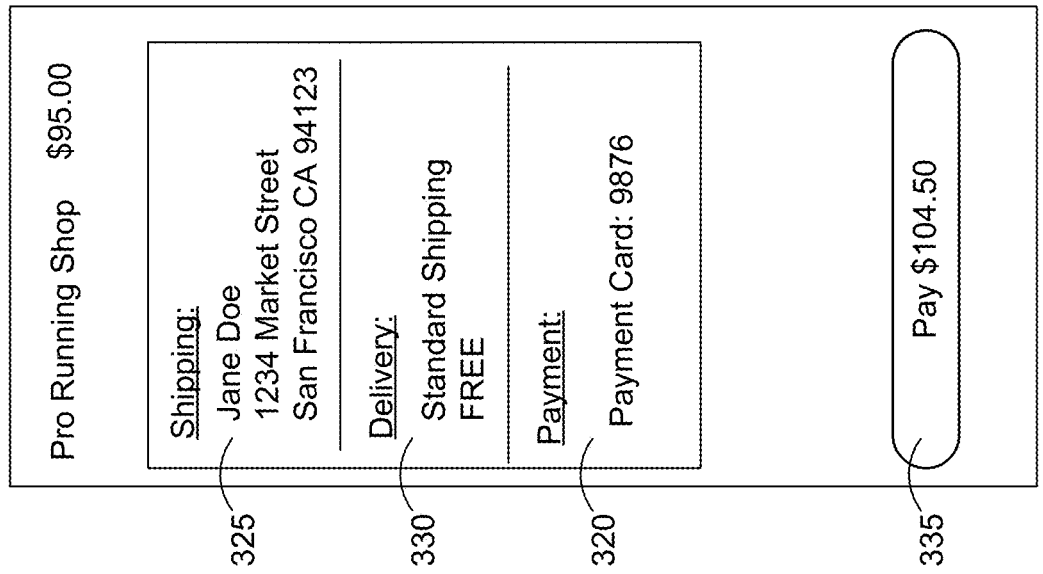

FIG. 3D illustrates an order confirmation interface 300d corresponding to the one-click order placed by the transaction processing system after the buyer selected the interactive element 335. The order confirmation interface 300d allows the user to review the order they just placed and may contain tracking information if it is available.

Particular embodiments disclosed herein may be implemented using one or more example architectures described herein. Underlying foundational concepts and terms of art relied upon may relate to one or more of the following:

A transaction processing system platform (of which the Bolt Platform is an example) consists of four conceptual parts. The frontend serves both the main consumer checkout flow as well as internal and external dashboards and administrative tools. The core services that power the checkout flow as well as fraud detection and payments. Bolt is architected as a set of independent services which communicate to each other via HyperText Transfer Protocol Representational State Transfer ("HTTP REST") or AMAZON Web Services Simple Queue Service ("AWS SQS") messages. The Bolt Application Programming Interface ("Bolt API"), which is the primary means by which merchant systems interface with Bolt, exposed to the outside world via HTTPS REST. Plugins, which are deployed to merchant systems and which connect these systems with the Bolt API.

Other foundational concepts and terms of art may relate to one or more of the following:
 Processor integrations to automate chargeback handling (syncing, representment)
 A regression model to predict chance of winning a representment. From the regression model the system may derive the expected value.
 A classification model to recommend action items to the merchant. Example action items including fighting chargebacks or not or what is the most valuable evidence.
 Merchant integration to potentially generate evidence automatically. Evidence may include:
  AVS results
  CVV results
  Billing/shipping addresses
  Historical orders
  Shipment receipt
  Tracking details
  Third party data on the user In all example embodiments described herein, appropriate options, features, and system components may be provided to enable collection, storing, transmission, information security measures (e.g., encryption, authentication/authorization mechanisms), anonymization, pseudonymization, isolation, and aggregation of information in compliance with applicable laws, regulations, and rules. In all example embodiments described herein, appropriate options, features, and system components may be provided to enable protection of privacy for a specific individual, including by way of example and not limitation, generating a report regarding what personal information is being or has been collected and how it is being or will be used, enabling deletion or erasure of any personal information collected, and/or enabling control over the purpose for which any personal information collected is used.

The frontend of the Bolt Platform is stored in a monorepo. It consists of the following sub-components:
- "Connect.js"—renders the Bolt checkout button and bootstrap iframe for checkout
- "checkout"—which is the user-facing component for checkout experience
- "Merchant"—which is the merchant facing dashboard
- "Admin"—which is the internal dashboard used by risk analysts, merchant success, and engineering The core services and the APIs are stored in a monorepo. Examples of services include:
- "API"—which is the set of APIs that power the checkout flow
- "adminapi"—which is the set of APIs that power the admin dashboard.
- "apihooks"—which sends webhook messages to merchant's shopping platforms
- "AsyncJobs"—which is the job framework to handle long-running asynchronous operations
- "Notifier"—which sends notifications such as emails and short message service ("SMS") messages
- "Imageproxy"—which is a lightweight proxy to serve images Backend services may be written in go (with some machine-learning ("ML") logic in python used for risk modeling). Frontend components may be written in React/Typescript. Data may be stored in Postgres, hosted by a relational database service (RDS). Another database used for state management may be Redis.

"Tokenizer" is a completely separate service, available in a serverless way to handle card tokenization. Tokenizer may be maintained completely separate do payment card industry security standards. Tokenizer may be made available in a serverless way, for example, through a service such as AMAZON Lambda. The tokenizer may be implemented in Typescript, powered by a postgres DB. All of the tokenizer infrastructure may be maintained by a separate provider account, with access restricted to a few people.

Below are more details about key services and technology components.

| Service/Component | Purpose/Functionality | Frameworks/Languages |
|---|---|---|
| API | All communication with 3p services, front end code, business logic | Golang |
| Connect.js and iFrame | Connect.js used for rendering checkout button, entry point for merchants IFrame is how we host checkout form, secure communication with API | React Typescript Webpack |
| checkout frontend | Components used to collect user information during checkout | React Redux Webpack Typescript |
| Notifier | Microservice for enqueueing and sending email and SMS notifications to consumers and merchants. | Golang SQS MAILGUN TWILIO |
| Account.js and iFrame | Used for BigCommerce account dashboard-also uses an Iframe to display data | React Redux Webpack Typescript |
| Shopping Dashboard | Features added to above Account.js | React Redux Webpack Typescript |
| Asynchronous jobs | Heavy lifting of job logic to perform tasks like funding, risk review, etc | Golang Redis Machinery |
| Apihooks (i.e Webhooks) | Microservice for enqueueing and sending webhook events to merchant platforms. | Golang SQS |
| Payment jobs | Scheduler for Asyncjobs framework | Golang Machinery Redis |
| Search | service to index transactions for merchant dashboard | Golang Elastic Search |
| Tokenizer | PCI compliant serverless lambda to store credit card information. Used to proxy information to 3rd parties | Node.js AWS Lambda AWS Key Management Service ("KWS") AWS RDS |
| Gatekeeper/A/B experimentation | Experimentation and feature rollout platform | Typescript AWS Simple Storage Service ("S3") AWS CLOUDFRONT |
| Sleet | Provides a standardized wrapper for implementing many payment processor gateways. | Golang |
| Risk pipeline | Modeling training and model serving | Golang Python SAGEMAKER |
| Track.js and iFrame | Used to track customer behavior when they land on merchant's page. Used for risk signals | Typescript React |
| Ledger | Double write bookkeeping service for funds. Tracks money movements through the system | Golang |
| Chargeback management | Automated system to pull chargeback information from various payment processors and display to merchants in the merchant dashboard chargeback portal | Golang React Typescript |
| Reporting and Reconciliation | Reports pulled from Vantiv and asyncjob with the ledger to ensure fee collection | Golang Asyncjobs AWS S3 |
| Merchant Dashboard | Centralized dashboard for all actions and reporting related to a merchant's management of their Bolt system. | GraphQL React Typescript |
| Admin Dashboard | Centralized dashboard for all internal actions related to managing Bolt merchants. | GraphQL React JavaScript |
| Admin API | API for actions done by Bolt internal employees (onboarding merchants, turning on features) and majority of use is for risk review | Goland GraphQL |

Integration with ecommerce platforms is supported in two ways. First, directly via the API. Second, with plugins deployed to the host instance.

Database: Data is stored in highly available postgres databases backed by AWS RDS. Databases can scale their components within available limits for disk (up to 16 TB), CPU/ram/network (db.x1e.32xlarge which is 64 cpu and 3,904 TB RAM).

Messaging: Both Consumer and Merchant-facing components do messaging through our Notifier Service.

Data Access: Services communicate via REST. GraphQL is used pervasively for all non-external endpoints.

Data Warehouse: A cloud data warehousing service may service as the main data warehouse that stores the refined data. AMAZON ELASTIC MAPREDUCE may be used for extract, transform, load ("ETL") workflows and general analysis of the raw data. AWS Step functions, triggered by a cloud watch event, and AWS Lambda may be used to run the ETL workflows. Results may be loaded into the data warehouse. Code such as ETL scripts may be separately managed. Data consumers (e.g. analysts who look at checkout events) use may use plugins to run queries.

Hosting model: The systems may run on highly available containerized backend services backed, for example, by DOCKER and KUBERNETES on AWS. The backend services may be scaled up/down with zero downtime. Infrastructure for serving the frontend code is highly available and backed by AWS. Frontend serving automatically scales with traffic load.

Logging: Frontend (Bolt checkout modal) logs are sent to an error monitoring and reporting tool. All backend applications (e.g., api, paymentjobs, asyncjobs, notifier, etc.) and infrastructure logs (e.g., kubernetes, AWS) are sent to a cloud monitoring platform. Logs may be archived for long-term storage.

Monitoring: High and low level monitors exist to notify engineers of issues. Monitors are replicated to non-production environments to ensure issues can be caught before they make it to production. Monitors are managed in code to ensure consistency and to track changes. Overall application service-level agreements (SLAs) are measured, and lower level monitoring of metrics and logs may be performed using a cloud monitoring platform.

Figure 4:
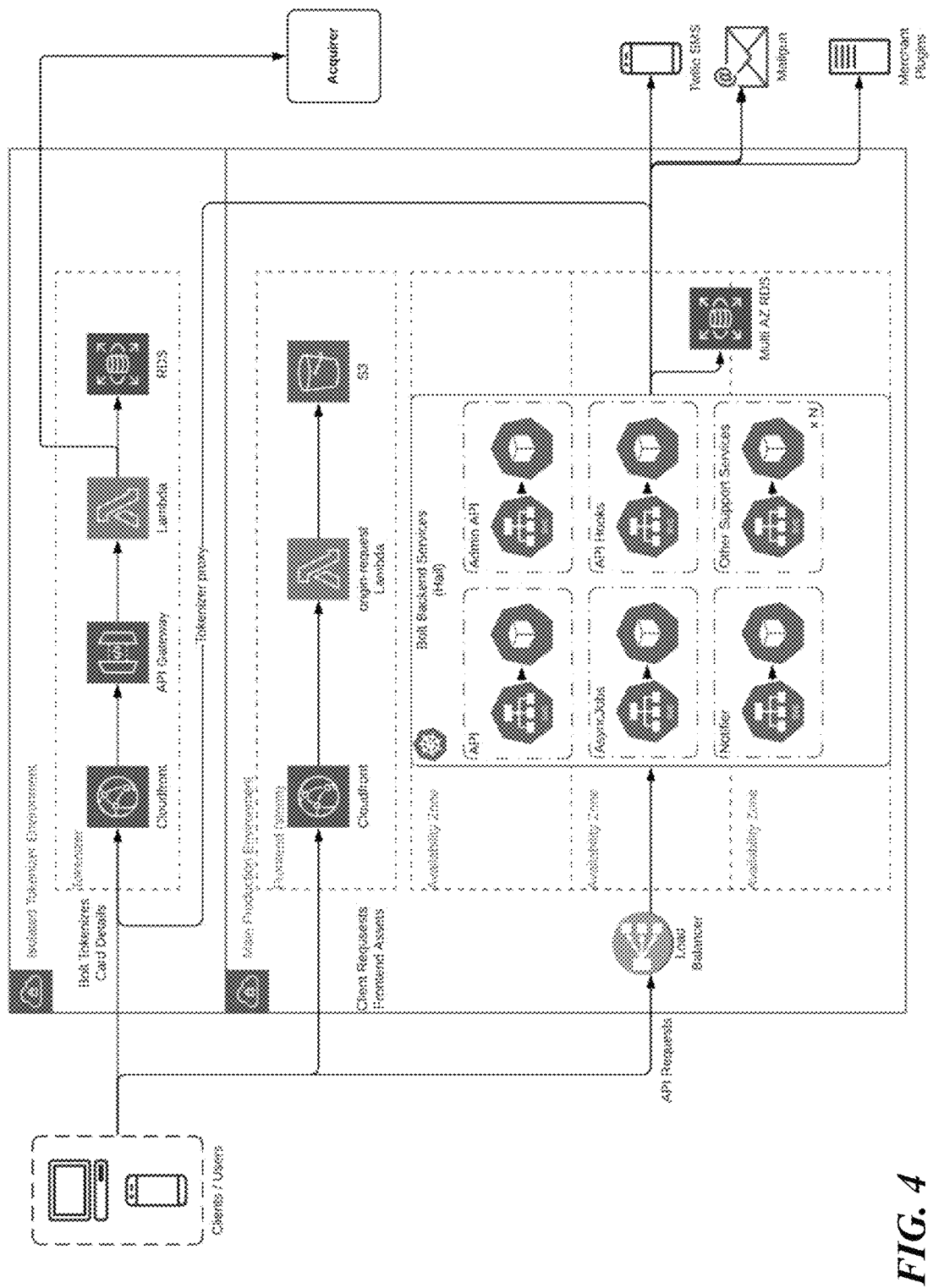
FIG. 4 illustrates a physical architecture of a transaction processing system platform.

FIG. 4 highlights the physical architecture of the platform.

Figure 5:
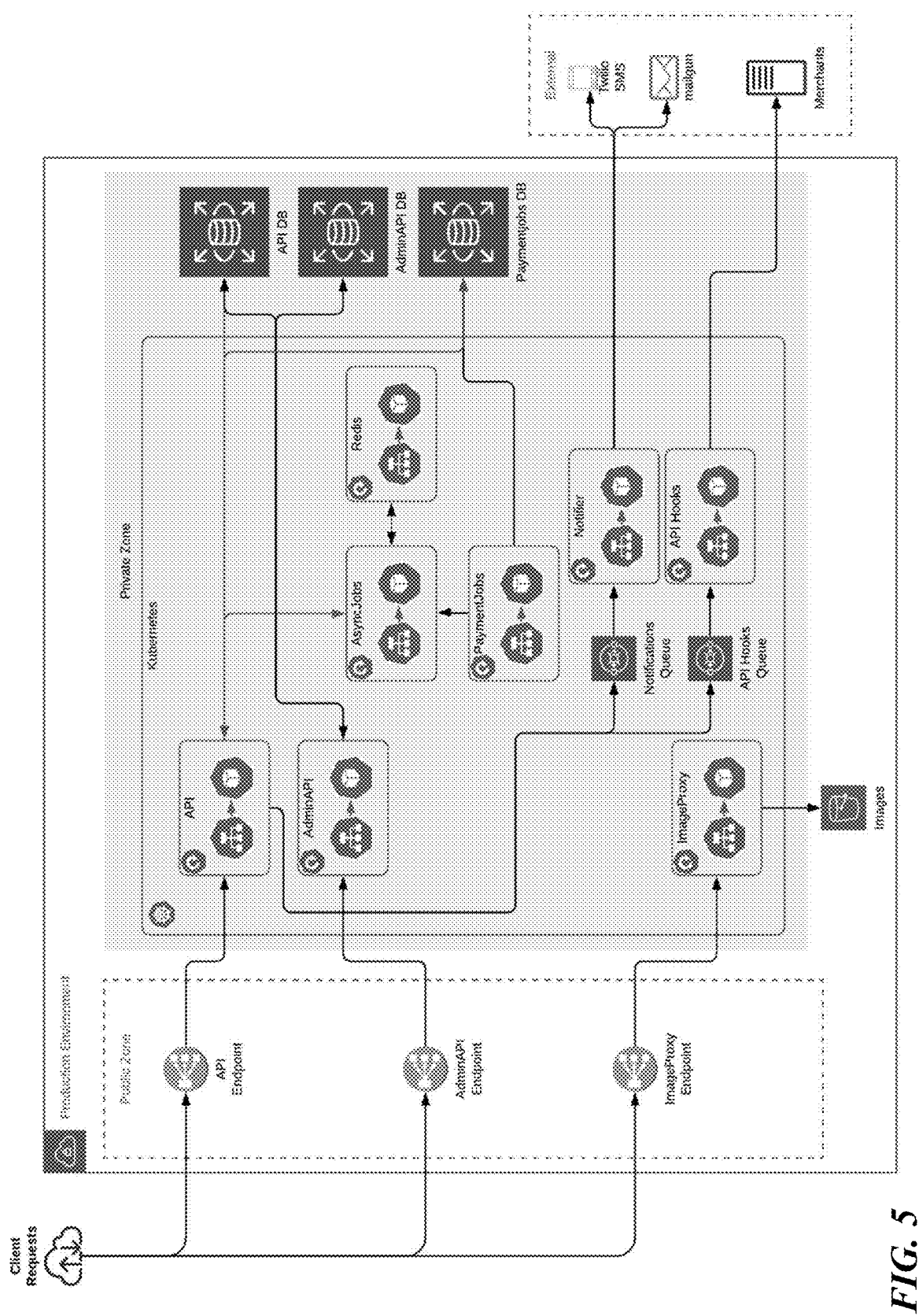
FIG. 5 illustrates an alternate visualization of the platform.

FIG. 5 shows an alternate visualization of the platform, focusing on backend services.

Figure 6:
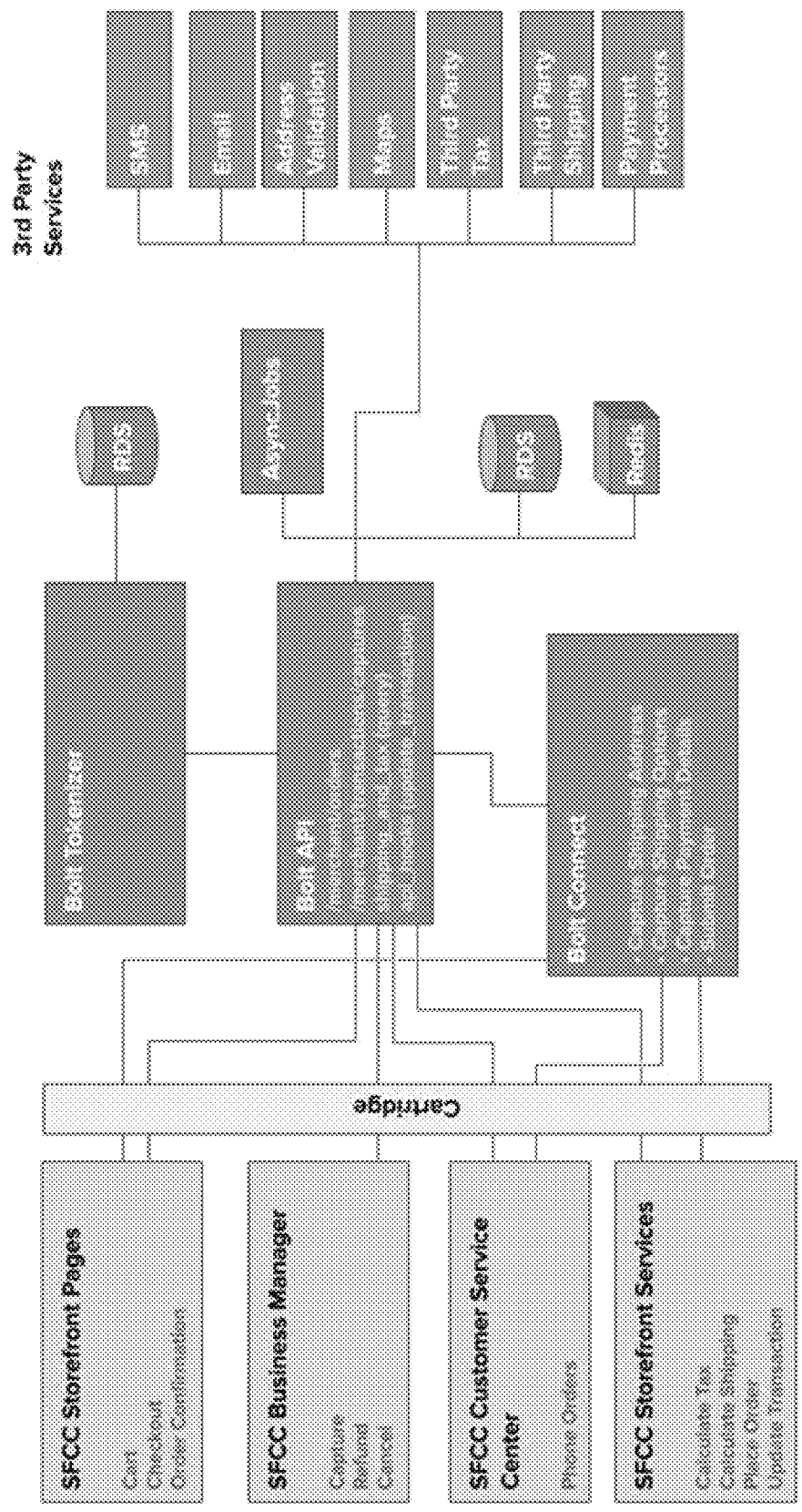
FIG. 6 illustrates transaction processing system platform connections with third party ecommerce platforms.

FIG. 6 is helpful in understanding how the platform connects with a third party ecommerce platform.

Figure 7:
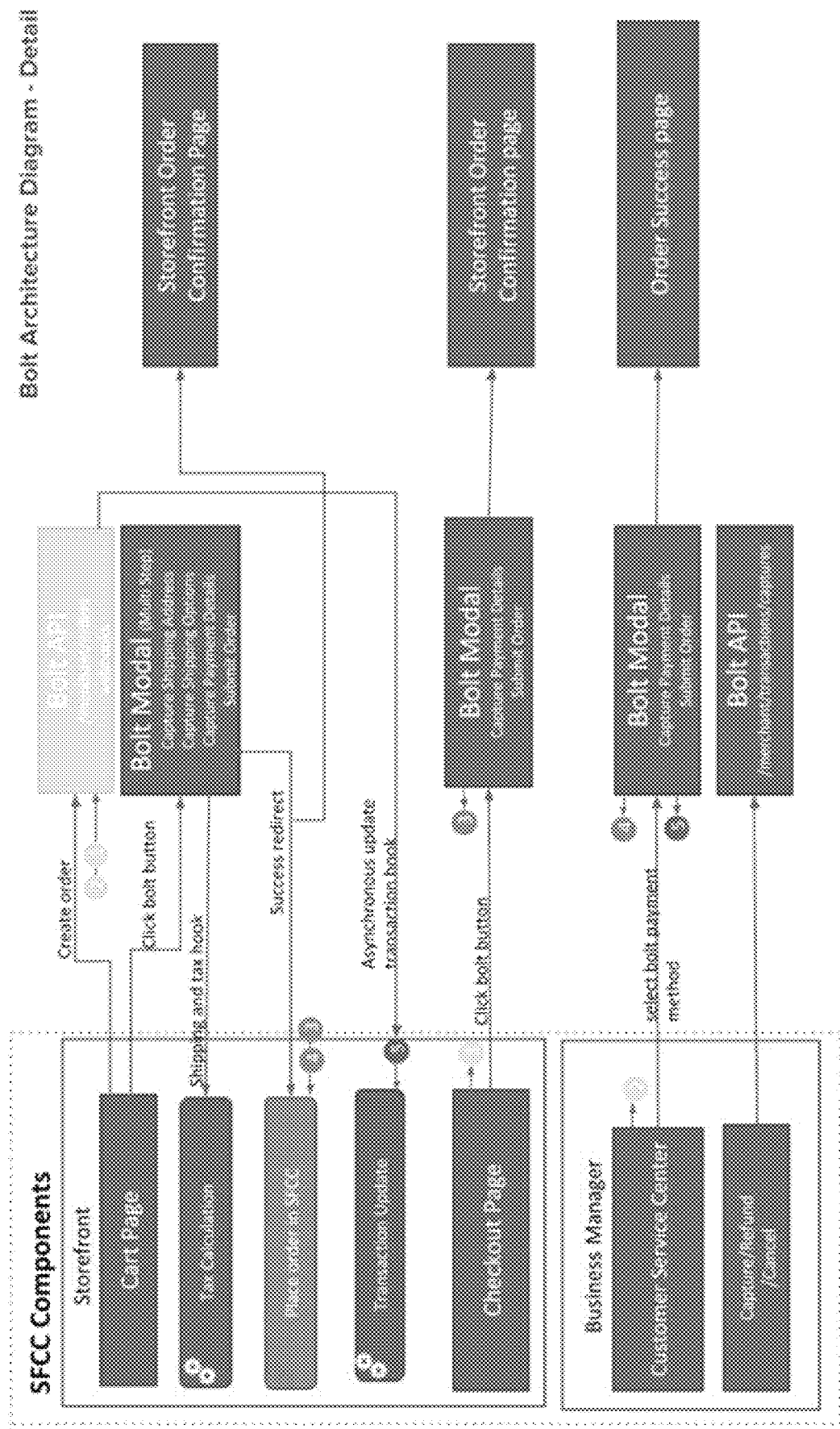
FIG. 7 illustrates information flows between the transaction processing system platform and a third party platform.

FIG. 7 dives a layer deeper and illustrates the information flows between the platform and a third party platform.

Figure 8:
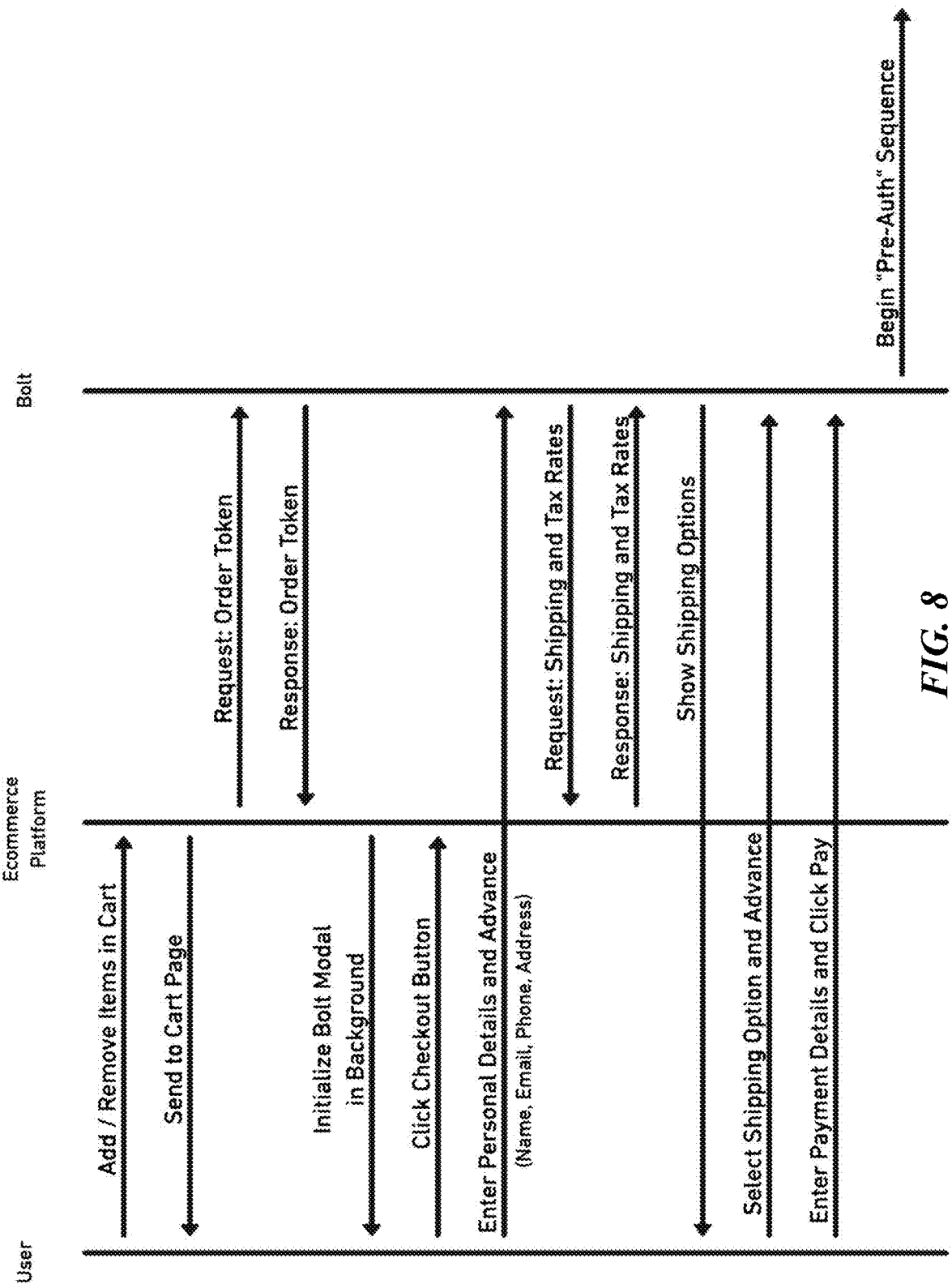
FIG. 8 illustrates the lifecycle of a purchase order.

FIG. 8 illustrates the lifecycle of a purchase order.

Figure 9:
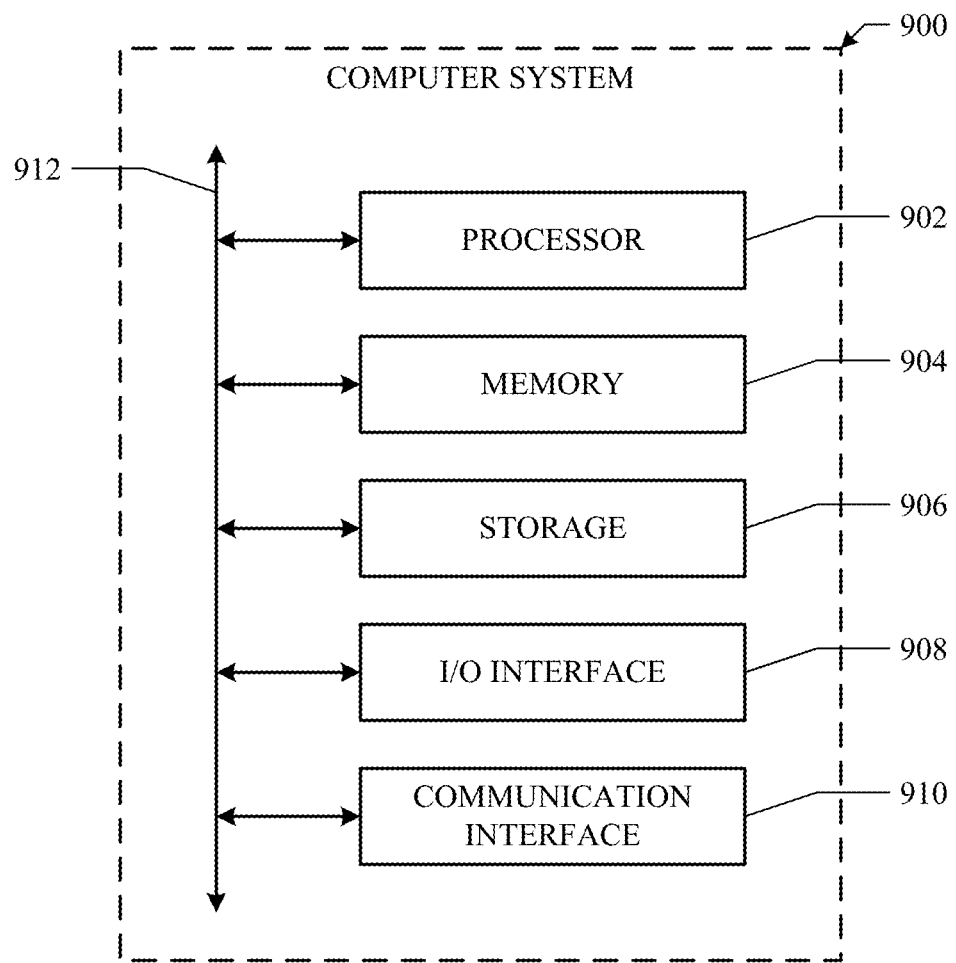
FIG. 9 illustrates an example computer system.

FIG. 9 illustrates an example computer system 900. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900. Herein, reference to a computer system may encompass a computing device, and vice versa, where appropriate. Moreover, reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, any reference herein to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
   facilitating, by a transaction processing system, placing a first order by a buyer with a seller, wherein the seller is an ecommerce merchant operating a website;
   sending, by the transaction processing system, to a system associated with the seller, a request for one or more personalized recommendations for one or more products to purchase in addition to the placed first order via an application programming interface (API) provided by the system associated with the seller;
   receiving, by the transaction processing system, from the system associated with the seller, the one or more personalized recommendations for one or more products;
   causing, by the transaction processing system, a post-purchase support interface corresponding to the first order to be presented to the buyer on a user device of the buyer, the post-purchase support interface comprising a plurality of interactive elements, wherein one or more first interactive elements of the plurality of interactive elements include a map element indicating current location information of an item associated with the first order, and wherein one or more second interactive elements of the plurality of interactive elements correspond to the one or more personalized recommendations for one or more products;
   receiving, by the transaction processing system from the user device of the buyer, a selection of one of the one or more second interactive elements corresponding to the one or more personalized recommendations for one or more products;
   retrieving, by the transaction processing system, payment information for the buyer based on receiving the selection of the second interactive element; and
   automatically facilitating, by the transaction processing system, a second order for a product corresponding to the selected second interactive element based on the retrieved payment information for the buyer.

2. The method of claim 1, further comprising:
   determining a personalized presentation of the plurality of interactive elements, wherein the personalized presentation comprises an order or position of the one or more second interactive elements corresponding to the one or more personalized recommendations in the post-purchase support interface.

3. The method of claim 1,
   wherein the system associated with the seller selects the one or more personalized recommendations for one or more products to purchase in addition to the placed first order based on:
   a time from the placing of the order;
   a method of placing the order; or
   a user device type of the user device.

4. The method of claim 1, wherein facilitating placing a first order by a buyer with a seller comprises:
   receiving a user identifier for the buyer;
   storing the user identifier in association with order information in a database associated with the transaction processing system.

5. The method of claim 4, further comprising:
   determining, by the transaction processing system, that the user identifier for the buyer corresponds with user account information stored in the database associated with the transaction processing system; and
   updating the user account information corresponding to the user identifier for the buyer in the database associated with the transaction processing system.

6. The method of claim 4, further comprising:
   determining, by the transaction processing system, that the user identifier for the buyer does not correspond with user account information stored in the database associated with the transaction processing system; and
   creating a new record of user account information corresponding to the user identifier for the buyer in the database associated with the transaction processing system.

7. The method of claim 1, wherein the post-purchase support interface comprises:
   an email sent to the buyer on behalf of the seller;
   a short message service message sent to the buyer on behalf of the seller;
   a web page provided by the seller or provided by the transaction processing system on behalf of the seller; or
   a user interface of an application associated with the seller or the transaction processing system executing on the user device.

8. The method of claim 1, wherein retrieving, by the transaction processing system, payment information for the buyer based on receiving the selection of the second interactive element comprises:
- determining a user identifier for the buyer based on the user device and the receiving the selection of the second interactive element; and
- retrieving the payment information for the buyer from a database associated with the transaction processing system using the determined user identifier.

9. The method of claim 8, wherein automatically facilitating the second order for a product corresponding to the selected second interactive element based on the retrieved payment information for the buyer comprises placing the second order for the product corresponding to the selected second interactive element using the retrieved payment information for the buyer without requiring further interaction from the buyer.

10. The method of claim 8, wherein automatically facilitating the second order for a product corresponding to the selected second interactive element based on the retrieved payment information for the buyer comprises:
- causing an account authentication user interface to be displayed to the user on the user device;
- sending a one-time password to the user device via a communication channel associated with the user identifier;
- receiving the one-time password from the user device via an account authorization user interface; and
- determining that the one-time password sent to the user device corresponds with the one-time password received from the user device via the account authorization user interface.

11. The method of claim 1, wherein the request for one or more personalized recommendations comprises a number of requested personalized recommendations, an identity of the seller, an amount of time since the first order is placed, or a list of items in the first order.

12. The method of claim 1, wherein the one or more second interactive elements corresponding to the one or more personalized recommendations comprise text, images, or videos.

13. The method of claim 1, wherein, upon the selection of one of the one or more second interactive elements corresponding to the one or more personalized recommendations, the user device of the buyer sends a message to the transaction processing system according to a programming associated with the selected second interactive element.

14. A method comprising:
- displaying, by a user device associated with a buyer, a post-purchase support interface corresponding to a first order previously placed by the buyer with a seller, wherein the seller is an ecommerce merchant operating a website, wherein the post-purchase support interface comprises a plurality of interactive elements, wherein one or more first interactive elements of the plurality of interactive elements include a map element indicating current location information of an item associated with the first order, and wherein one or more second interactive elements of the plurality of interactive elements correspond to one or more personalized recommendations for one or more products to purchase in addition to the previously placed first order, wherein the one or more personalized recommendations are received from a system associated with the seller by sending, to the system associated with the seller, a request for the one or more personalized recommendations via an application programming interface (API) provided by the system associated with the seller;
- receiving, by the user device, a user input corresponding to a selection of one of the one or more second interactive elements corresponding to the one or more personalized recommendations for one or more products;
- sending, by the user device, a message corresponding to the selection of the one of the one or more second interactive elements to a transaction processing system; and
- receiving, by the user device from the transaction processing system, a confirmation that a second order has been automatically placed with the second seller on behalf of the buyer for an item corresponding to the selected one of the one or more second interactive elements.

15. The method of claim 14, further comprising:
- displaying, by the user device, a post-purchase support interface corresponding to the second order automatically placed on behalf of the buyer for an item corresponding to the selected one of the one or more second interactive elements.

16. The method of claim 14, further comprising, subsequent to sending the message corresponding to the selection of the one of the one or more interactive elements to the transaction processing system:
- displaying, by the user device, an account authentication user interface; and
- receiving, by the user device, a user input corresponding to a one-time password via the account authentication user interface.

17. The method of claim 14, wherein the post-purchase support interface comprises:
- an email sent to the buyer on behalf of the seller;
- a short message service message sent to the buyer on behalf of the seller;
- a web page provided by the seller or provided by the transaction processing system on behalf of the seller; or
- a user interface of an application associated with the seller or the transaction processing system executing on the user device.

18. A system comprising:
a transaction processing system; and
a user device associated with a buyer;
wherein the transaction processing system is configured to:
- facilitate placing a first order by a buyer with a seller, wherein the seller is an ecommerce merchant operating a website;
- send, to a system associated with the seller, a request for one or more personalized recommendations for one or more products to purchase in addition to the placed first order via an application programming interface (API) provided by the system associated with the seller;
- receive, from the system associated with the seller, the one or more personalized recommendations for one or more products;
- send the one or more personalized recommendations for one or more products to purchase in addition to the placed first order to the user device;
wherein the user device associated with the buyer is configured to:
- display a post-purchase support interface corresponding to the first order, the post-purchase support interface comprising a plurality of interactive elements, wherein one or more first interactive elements of the plurality of interactive elements include a map element indicating current location information of an item associated with the first order, and wherein one or more second interactive elements of the plurality of interactive elements correspond to the one or more personalized recommendations for one or more products;

receive a user input corresponding to a selection of one of the one or more second interactive elements corresponding to the one or more personalized recommendations for one or more products; and send the selection of the one of the one or more second interactive elements corresponding to the product recommendation to the transaction processing system;

wherein the transaction processing system is further configured to:

retrieve payment information for the buyer based on receiving the selection of the second interactive element; and automatically facilitate a second order for a product corresponding to the selected second interactive element based on the retrieved payment information for the buyer.

* * * * *